United States Patent
Cao (10) Patent No.: US 11,238,649 B2
(45) Date of Patent: Feb. 1, 2022

(54) METHOD AND SYSTEM FOR HYBRID MODELING USING GEOMETRIC FACETS

(71) Applicant: Shangwen Cao, Montreal (CA)

(72) Inventor: Shangwen Cao, Montreal (CA)

(73) Assignee: Nature Simulation Systems Inc., Montreal (CA)

( * ) Notice: Subject to any disclaimer, the term of this patent is extended or adjusted under 35 U.S.C. 154(b) by 56 days.

(21) Appl. No.: 16/695,305

(22) Filed: Nov. 26, 2019

(65) Prior Publication Data

US 2021/0158612 A1    May 27, 2021

(51) Int. Cl.
    *G06T 17/10*    (2006.01)
(52) U.S. Cl.
    CPC ...... *G06T 17/10* (2013.01); *G06T 2219/2021* (2013.01)
(58) Field of Classification Search
    None
    See application file for complete search history.

(56) References Cited

U.S. PATENT DOCUMENTS

| | | | | |
|---|---|---|---|---|
| 8,954,295 | B1 * | 2/2015 | Vicknair | G06F 30/00 703/1 |
| 2006/0290695 | A1 * | 12/2006 | Salomie | G06T 17/20 345/420 |
| 2007/0057945 | A1 * | 3/2007 | Olson | G06T 17/10 345/424 |
| 2010/0250201 | A1 * | 9/2010 | Sivovolenko | G06T 17/10 703/1 |
| 2012/0182297 | A1 * | 7/2012 | Hanniel | G06T 17/10 345/421 |
| 2018/0018818 | A1 * | 1/2018 | Cao | G06T 15/04 |
| 2018/0365371 | A1 * | 12/2018 | Urick | G06F 30/20 |
| 2020/0051312 | A1 * | 2/2020 | Muthler | G06T 15/06 |
| 2020/0051318 | A1 * | 2/2020 | Muthler | G06T 1/20 |
| 2020/0211281 | A1 * | 7/2020 | Randon | G06T 17/20 |

OTHER PUBLICATIONS

Qiu et al., "Geometric Model Simplification for Distributed CAD" (Year: 2004).*
Weber et al. "Creation and Rendering of Realistic Trees" (Year: 1995).*

* cited by examiner

*Primary Examiner* — Hilina K Demeter (57) ABSTRACT

This invention presents a method and a system that use rendering facets to conduct hybrid geometric modeling for three dimensional product design, wherein a geometry operation comprises the steps: mapping rendering facets to operating facets, creating intersection lines, splitting each triangle through which an intersection line passes, sectioning geometries, regrouping facets to form new geometric objects, and mapping each new geometric object to rendering facets. To record modeling process, the method has the steps: allocating a Constructive Hybrid Geometry object, making up each Operating Geometry including a geometry object and operational parameters, adding an Operating Geometry to the object, conducting operations with the facets, and updating operational results. The system is flexible and able to create fine and variant geometric models with primary geometric objects, extended geometric objects and surface patches.

18 Claims, 5 Drawing Sheets

METHOD AND SYSTEM FOR HYBRID MODELING USING GEOMETRIC FACETS

BACKGROUND

Field of the Invention

This invention provides a method and a system embedding the method performing Boolean operations and geometry trimmings for building three dimensional geometric product models with rendering facets of primary geometric objects, extended shapes and surface patches to Computer Aided Design and Computer Graphics systems, which are widely used to design products and simulate environmental objects.

Related Art

A computer comprises a screen that displays user interface, input devices including a mouse and a keyboard by which a user inputs text and clicks items on the screen, a processor that executes instructions and commands, and a media that stores data and executable instructions.

A CAD/CG system is implemented in a computer system and operates with a computer, and has a few of pre-defined geometric shapes, for example, primary geometric objects, by which the user constructs complex geometric models.

If a system builds geometric models using primary geometric shapes, each of which spatially closes a volume and is watertight, then the system is a solid geometric modeling system.

Figure 1:
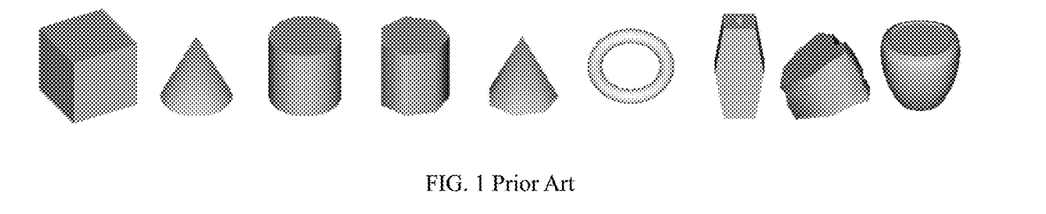
FIG. 1 shows the most popular primary geometric shapes, including box, cone, cylinder, prism, pyramid, torus, facets closed volume, extruded shape, and revolved shape, which may be used to conduct Boolean operations in a solid modeling system.

In a solid geometric modeling system, primary geometric shapes may include box, cone, cylinder, prism, pyramid, torus, facets closed volume, and the system may provide commands, such as extrude and revolve, for creating extended shapes. FIG. 1 shows some primary geometric shapes and extended geometric objects created with extrusion and revolution operations. Some or all of the shapes are adopted to participate in Boolean operations, which have AND, OR, NOT functions, for building geometric product models.

If a system builds a geometric model with multi surface patches, the system is a surface modeling system. A surface patch is defined by a set of points, orders, knots and weights that control the shape of a geometric object, which may not be spatially closed.

A surface modeling system has two kinds of commands: creating a surface patch and trimming.

Figure 2:
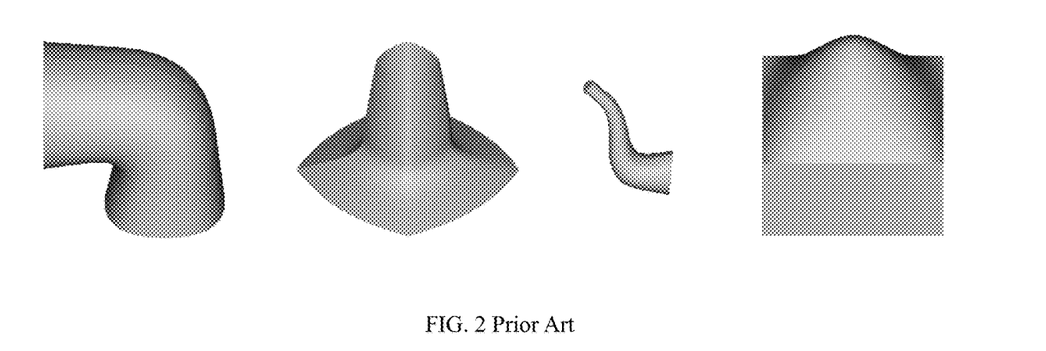
FIG. 2 displays some surface patch examples created with different surface creation commands that are widely used in surface modeling systems. One of the examples, whose image is the smallest, is closed volume. The first three examples are rendered with a seam, but are actually pretty smooth.

A surface patch creation command generates control points, knots, orders and weights. These commands: extrude, revolve, bend and connect, are examples, which create very different shapes. FIG. 2 displays some surface patches generated with these commands.

A trimming command enables a surface to be trimmed with a contour line or a surface. The contour line can be a line on the surface, or the contour line is a two dimensional line and it is mapped to three dimensional space where the surface is located.

While conducting a surface-surface trimming, a surface usually intersects with another surface and each surface is divided into two or more sections, in which usually one section is reserved for building a geometric model.

If a system conducts Boolean operations with both primary geometric shapes and surface patches, or the system conducts trimmings with both primary geometric shapes and surface patches, the system is a hybrid geometric modeling system.

Constructive Solid Geometry, widely used in CAD/CG systems, is a technique recording operation sequence and geometric objects with a hierarchical data structure. A system using CSG defines a few of primary geometric shapes. A Boolean operation has one of the three functions and two geometric objects, each of which defines a boundary separating a space into two half spaces, internal and external. The internal half space is assumptively filled with material, the external half space is empty. A leaf node of the hierarchical data structure records a geometric object, an internal node indicates a Boolean function type and links up with leaf nodes and branch nodes.

Boundary Representation, which is regarded as a more flexible way that supports more geometric shapes like extended geometries, uses surfaces as boundary to represent geometric models and has two pairs of data structures. One pair of the data structures denote geometric elements, point, curve, and surface; another pair specify topological elements, vertex, edge, loop, face, and shell, which record how the geometric elements connect to each other. The numbers of the five elements satisfy Euler-Poincare formula, which has a set of Euler operators and rules that enable creating and removing topological elements without destroying a geometric model's overall shape.

DISCLOSURE OF THE INVENTION

Figure 5:
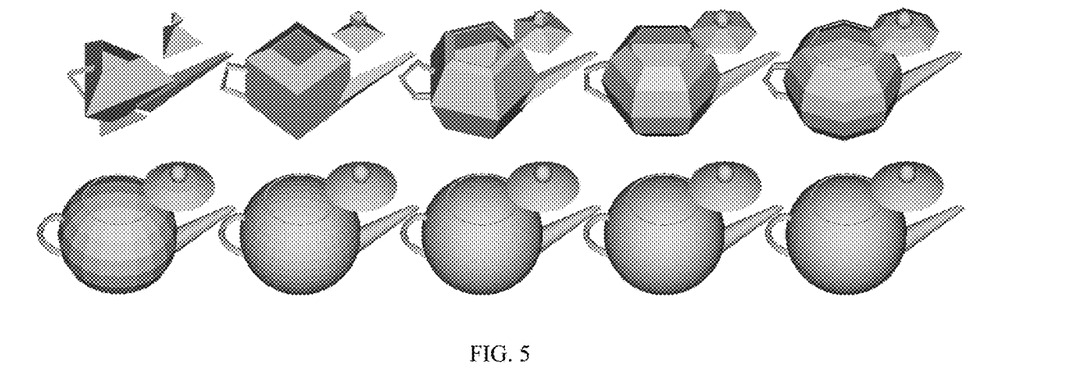
FIG. 5 displays ten models that this system generated, each of which contains two solid objects, has mass, and is created with a surface patch and nine primary geometries conducting nine Boolean operations. The base of each teapot is scooped out with a cylinder. All the models use the same geometries and the same patch decomposed into different facets. In the first model, the patch's position is slightly adjusted to ensure an intersection.
Figure 6:
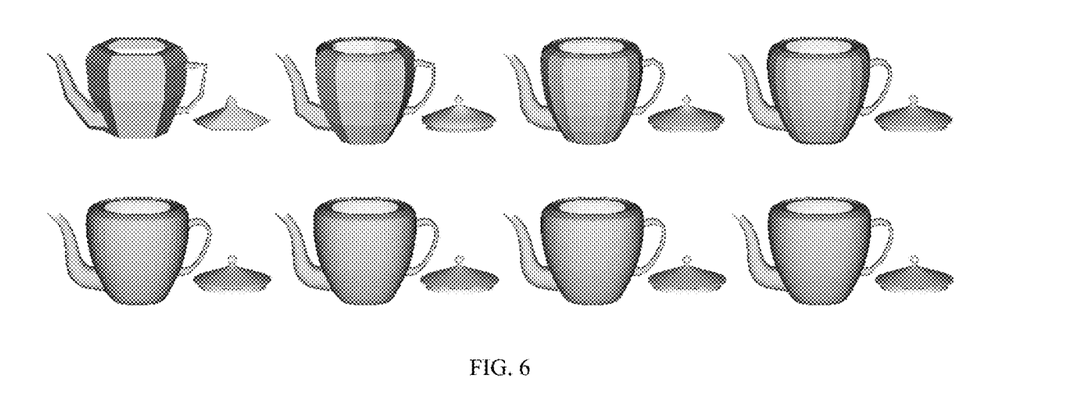
FIG. 6 shows eight models that this system generated, all of which are open and have no mass. Each of the models is built with four surface patches, one patch does not participate any geometry trimmings. The patches are identical in the models and decomposed into different facets.
Figure 7:
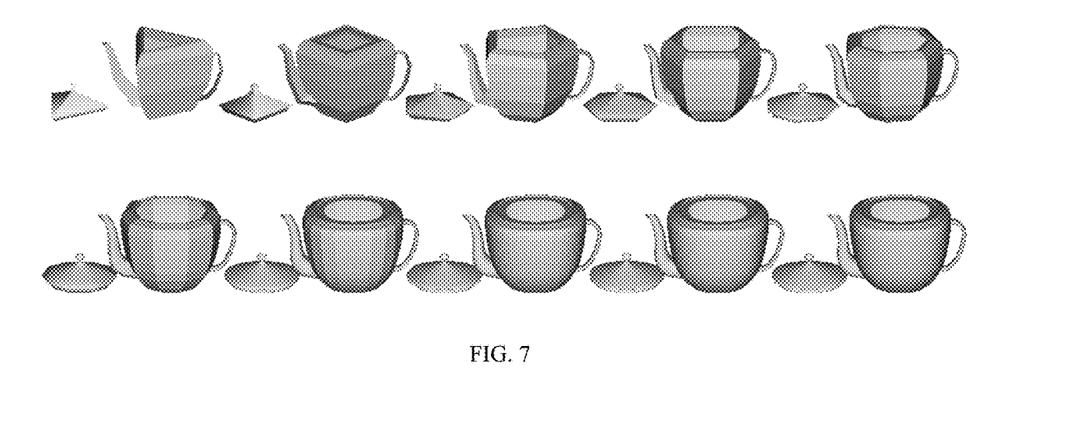
In FIG. 7, there are ten models that this system generated, all of which are solid, have mass, and are created with six identical surfaces patches and a cylinder, decomposed into different facets. One of the patches forms the covers and does not participate in any geometry trimmings.

This method and this system embedding this method build geometric models using a wide range of geometric shapes, including primary geometries, surface patches and extended geometries, which are displayed with geometric facets, to conduct Boolean operations and geometry trimmings. This method and this system are flexible, and are able to create fine and variant models. FIGS. 5-7 shows some models that this system generated.

Figure 3:
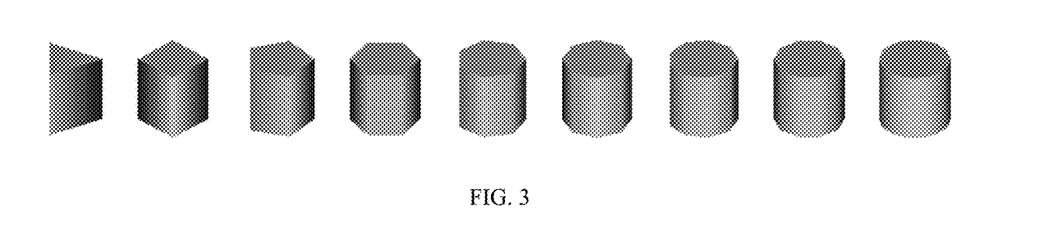
FIG. 3 shows that a cylinder is decomposed into different facets and simulates variant prismatic objects. With more facets, the shapes become smoother.

A system decomposes geometric objects into facets and display the facets to represent primary geometries, extended geometric and surface patches. Triangles are the simplest facets. A geometric object, a primary geometry, extended geometry or a surface patch, can be decomposed into different facets and create significantly different shapes that are meaningful in product designs. FIG. 3 shows a cylinder with variant facets, and FIG. 4 displays a surface patch rendered with different tessellations.

This method uses rendering facets, which are geometric facets being rendered to represent geometric objects, to conduct Boolean operations and geometry trimmings. Given two geometric objects A and B, to conduct a geometry operation, that is, a Boolean operation or a geometry trimming, the first step is to map rendering facets of each geometric object to an operating triangle set and set up neighbors for each triangle.

To build an intersection line of the geometric objects, this method starts with searching A and B for an intersection point where a pair of triangles ($T_a$, $T_b$) intersect, in which triangle $T_a$ belongs to object A and triangle $T_b$ belongs to object B.

A triangle of object A and a triangle of object B have zero, one or two intersection points. If an edge of $T_a$ intersects with $T_b$ and the intersection point falls in $T_b$, then the two triangles have an intersection point.

To extend the intersection line, this system checks the neighbors of the triangles $T_a$ and $T_b$.

The above step usually repeats more times until all triangles of the objects are checked, and the system generates zero, one or more intersection lines.

This method splits each triangle through which an intersection line passes with modified Watson method that generates two dimensional Delaunay meshes. An intersection line may have one or more sections that fall in the triangle, and the sections divide the triangle into three or more smaller triangles.

When conducting a geometry trimming, this method sections geometries with intersection lines, an intersection line divides a geometry into two sections, left side or right side. A section is classified into two types: to be reserved or to be discarded. A section is identified as to be reserved if the section's geometric property matches with an operational parameter: reservation type.

This method classifies triangles into two types for Boolean operations: obscure and visible. A triangle is obscure if it is spatially closed by a geometric object.

This method regroups the triangles, some triangles are removed and some triangles are copied together to form new geometric objects. For Boolean operations, depending on operation type, both obscure and visible triangles may be reserved; for geometry trimmings, only visible triangles are reserved to form new geometric objects.

The method generates rendering facets for new geometric objects. Coordinate values of the new geometric objects are copied to a rendering facet set, and triangles are copied to the rendering facet set.

The mapping step generates an operating triangle set for each geometry that participates in a geometry operation.

This method defined these classes for geometry operations: Constructive Hybrid Geometry, Operating Geometry, Geometric Operation Property, and Operating Triangle.

The Constructive Hybrid Geometry class has two attributes, operation sequence and operational results, which are two lists. At initial state, the two lists are null.

The Operating Geometry class has two attributes, geometric object and operational parameters. A geometric object is defined with geometric parameters including size, dimension and position that initialize a shape. The operational parameters describe 1) an operation type and which sections of the geometry are to be reserved for generating a geometric operational result, 2) facet property specifying how the object is actually rendered to represent the shape that is to be operated in a geometry operation.

This method uses rendering facets to represent operational results. When an Operating Geometry is selected to conduct a geometry operation or when an Operating Geometry in a Constructive Hybrid Geometry object is updated and all of its parameters are meaningful, the system generates operational results.

Operational results are recorded in a Constructive Hybrid Geometry object, where the results contain zero, one or more sets of geometric facets, each set represents a geometric object.

For recording a geometric modeling process, this method conducts five steps: allocating a Constructive Hybrid Geometry object that contains an operation sequence and operational results, creating or selecting an Operating Geometry that contains a geometric object and operational property, appending the geometry to the object, mapping rendering facets of the Operating Geometry and each geometric object in results to operating triangles for geometry operations, and updating operational results of the object.

CLASSES

This method defined these classes: Operating Triangle that describes a triangle, by which this system conducts geometry operations; Operating Geometry that describes a geometric object with operational parameters; Geometry Operation Property that specifies geometric operational parameters. When being selected or created to construct a geometric model, a geometric object attaches operational parameters to form an Operating Geometry that participates in a geometry operation.

Operating Triangle

The Operating Triangle class has four attributes: vertices that are three pointers point to coordinate values, a plane that contains four floating point numbers denoting a plane equation defined by the triangle, a normal that contains three floating point numbers, and a maximum of three neighbors.

```
class OperatingTriangle
{
    OperatingTriangle   *neighbors[3];   // neighboring triangles
    OperatingPoint      *point[3];       // vertices, *P_0, *P_1, *P_2
    Plane               plane;           // plane equation
    Normal              normal;
};
```

The Operating Triangle Set class has two attributes, a set of operating triangles that correspond to the rendering facets of a geometric object, and a set of operating points that provide the triangles with coordinate values.

```
class OperatingTriangleSet
{
    DataSet<OperatingPoint>      points;
    DataSet<OperatingTriangle>   triangles;
};
```

An Operating Point has an id number and three floating point numbers indicating a spatial position.

Operating Geometry

A geometric object in this system is a primary geometry that is watertight, or an extended geometry generated through extension or other methods, or a surface patch that is spatially closed or open.

```
class OperatingGeometry
{
    Data   *geometry;
    Data   *operationalProperty;
};
```

Figure 4:
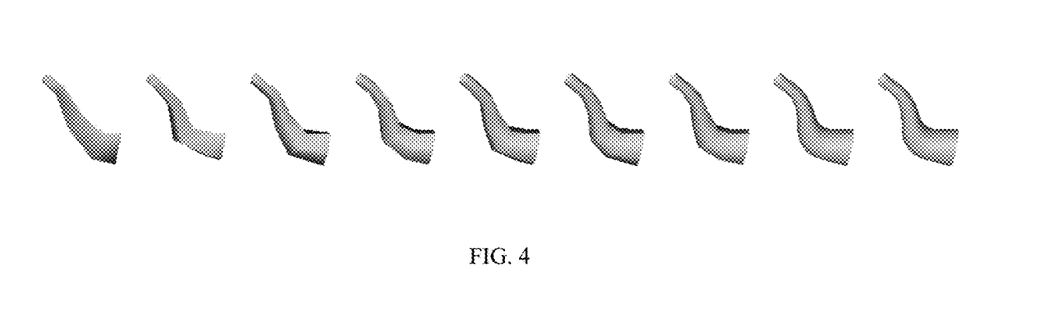
FIG. 4 shows that a surface patch is tessellated with two parameters in different directions and generates different geometric objects.

The Operating Geometry class has two attributes: 1) geometry that specifies a geometric object denoting a geometry type and its properties including size, dimension and position, or control points, knots, weights and orders; 2) operational property that contains an array of numbers describing how the geometric object is decomposed into facets for rendering. When describing a primary geometry or an extended geometry, the array contains zero up to four numbers. In FIG. 3, the facet property attribute has three integer numbers controlling the facets. For defining facets to render a surface patch, the array may simply contain up to two numbers describing how the patch is to be tessellated. In FIG. 4, the array has two numbers denoting the tessellations in u and v directions, the object on the left side uses fewer facets than the object on the right side.

Geometry Operation Property

The Geometry Operation Property class is a Data and has two derived classes, Boolean Operation Property and Geometry Trimming Property, by which geometric objects participate in hybrid geometric modelings.

```
class GeometryOperationProperty : Data
{
    DataType values[DIMENSION];  // DIMENSION is 4 or bigger than 4
};
```

```
class BooleanOperationProperty : GeometryOperationProperty
{
    Description *type;  // Boolean operation type
};
class GeometryTrimmingProperty : GeometryOperationProperty
{
    Description *reservationType;  // reservation type
    Description *separation;
};
```

A Geometry Operation Property object directs this system to conduct either a Boolean operation or a geometry trimming.

In this system, a Geometry Operation Property object is valid disregarding whether an Operating Geometry refers to a primary geometry or a surface patch when the property points to either a Boolean operation or a trimming operation.

The Boolean Operation Property class contains an attribute, type, whose data type is a string, or an integer number, or a character, indicating combination, intersection, exclusion, difference or division, which are the types of Boolean operations by which geometric objects construct geometric models.

Figure 8:
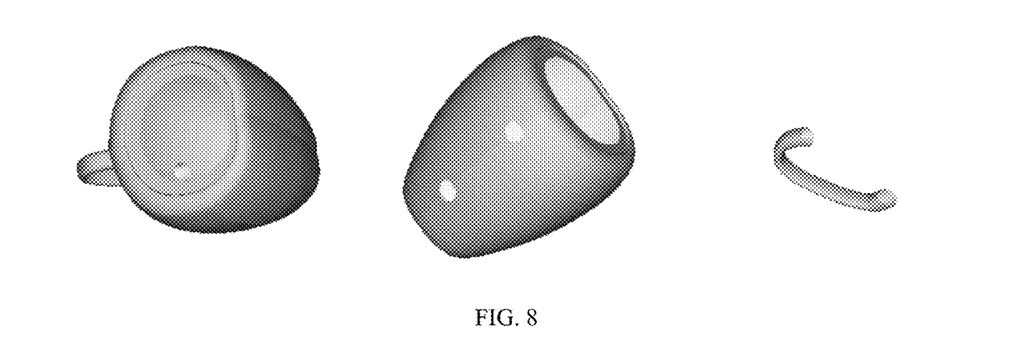
In FIG. 8, the left is a model made up of two surface patches, and a trimming operation divides each of the patches into three sections. The right parts show the sections retained for building the model.

The Geometry Trimming Property class has an attribute, reservation type, specifying which sections are to be reserved when a geometry is trimmed by another object. The attribute has two values corresponding to two geometries that participate in a trimming operation. Each value can be a string, or an integer number, or a character, indicating one or more sections. Normally, when an object is trimmed, two or more sections are generated. In FIG. 8, a trimming operation divides each geometry into three sections, the values of the reservation type are {BIG, BIG}, indicating that the biggest section of each geometry is reserved to form the operational result.

The Geometry Trimming Property class has an attribute, separation, a Boolean value, indicating whether a trimming operation generates one or more geometric objects. When the value is TRUE, the trimming operation generates multiple objects; a value of FALSE indicates that the trimming operation generates a single object that contains a set of points and a set of facets.

Geometry Trimming

Two geometries A and B trim each other and generate more sections, each of which is reserved or discarded for building a geometric model.

Operational parameters set up which sections are to be reserved for creating new geometric objects, this method also allows a geometry trimming to retain visible or obscure triangles for modeling.

Mapping to Operating Facets

Mapping rendering facets of a geometric object to an operating triangle set includes the steps: copying points from rendering facets to the operating triangle set and ensuring no identical points; copying triangles from rendering facets to the operating triangle set; setting up the plane equation and the normal for each triangle in the operating triangle set; and setting neighboring triangles for each triangle in the operating triangle set.

If two points $P_i(x,y,z)$ and $P_j(x,y,z)$ satisfy the condition: $|P_i(x)-P_j(x)|>\varepsilon$ and $|P_i(y)-P_j(y)|>\varepsilon$ and $|P_i(z)-P_j(z)|>\varepsilon$, where ε is a positive floating point number, then point $P_i$ is identical to $P_j$, noted as $P_i==P_j$.

If two triangles $T_0$ and $T_1$ in a geometric object satisfy the following condition, then the i-th neighbor of triangle $T_0$ is $T_1$.

$$(P_i==P_j \text{ and } P_{(i+1)\%3}==P_{(j+1)\%3}) \text{ or } (P_i==P_{(j+1)\%3} \text{ and } P_{(i+1)\%3}==P_j)$$

Intersection Lines

Generating an intersection line contains two steps: searching A and B for a pair of triangles ($T_a$, $T_b$) that intersect each other by performing edge-triangle intersection calculation, where triangle $T_a$ belongs to object A, and triangle $T_b$ belongs to object B; searching neighboring triangles of the triangle pair and performing edge-triangle intersection calculation to extend the intersection line.

When performing the calculation, this system checks if an edge of triangle $T_a$ intersects with the plane defined by triangle $T_b$ at a point that falls in $T_b$, that is, the point is inside $T_b$, or the point is on an edge of $T_b$, or the point is a vertex of $T_b$, then the edge and the triangle has an intersection point, the two triangles intersect, this system marks each triangle in the pair and adds the intersection point to the intersection line.

When extending the intersection line, this system catches unmarked neighbors and performs edge-triangle intersection calculation. If the calculation gets an intersection point, this system appends the point to the end of the intersection line. The step extending the intersection line continues until all triangles are traveled or the intersection line gets closed, where the start point of the line is identical to the end point of the line.

The step generating an intersection line usually repeats more times until all triangles are searched and a trimming operation generates zero, one or more intersection lines.

Splitting Triangles

For splitting a triangle through which an intersection line passes, this system generates sub-intersection lines, each of which is a section of the intersection line, wherein each intersection point of the section is in the triangle.

Given an intersection line that passes a triangle, to generate a sub-intersection line, this system conducts the steps: start from marked position, sequentially check each intersection point whether it is in the triangle; if a point is in the triangle, add the point to the sub-intersection line, check its following intersection points in the intersection line until the line end or until a point that is out of the triangle, and mark the position for generating another sub-intersection line.

An intersection line may have one or more sub-intersection lines that falls in a triangle, and a geometry operation may have more intersection lines that pass through the triangle.

When this system is generating the first sub-intersection line from an intersection line, the marked position is the start point of the intersection line.

To split a triangle, this system maps the triangle and all its sub-intersection lines onto a two dimensional plane according to the normal of the triangle, and uses modified Watson method containing the steps: building an outline point sequence linking all the sub-intersection lines and vertices of the triangle where applicable, adding four points forming a bigger box that encloses the point sequence; splitting the box into two triangles with one of the diagonal lines and adding the triangles to a triangle set; inserting every point of the sub-intersection lines into the triangle set, comprising the steps: splitting each triangle whose circumcircle contains the point or through which the last two points formed segment passes, erasing it from the triangle set and adding it to a deletion triangle set, forming a polygon with the deletion triangle set and clearing the deletion triangle set, using the polygon to generate triangles and adding the triangles to the triangle set.

After splitting triangles, this system deletes the split triangles.

Sectioning

An intersection line divides a section or a geometry into two sections, intersection lines divide a geometric object into more sections. This method conducts following the procedure to section a geometry with an intersection line, where the geometry contains a set of operating triangles:
1. Set the identification number of each point in the operating triangle set of the geometric object to be zero;
2. Set identification numbers of the points of the intersection line in ascending order;
3. Mark a triangle to be a boundary triangle if one of its point identification number is not zero;
4. Determine each triangle whether it is to the left side or right side of the intersection line and assign an id for marking LEFT or RIGHT;
5. Calculate each section's geometric property that is volume, or area, or facet amount, or visibility;
6. Compare each section's geometric property with reservation type and set each triangle in the section to be RESERVED or DISCARDED.

Reservation Type and Visible Facets

Figure 9:
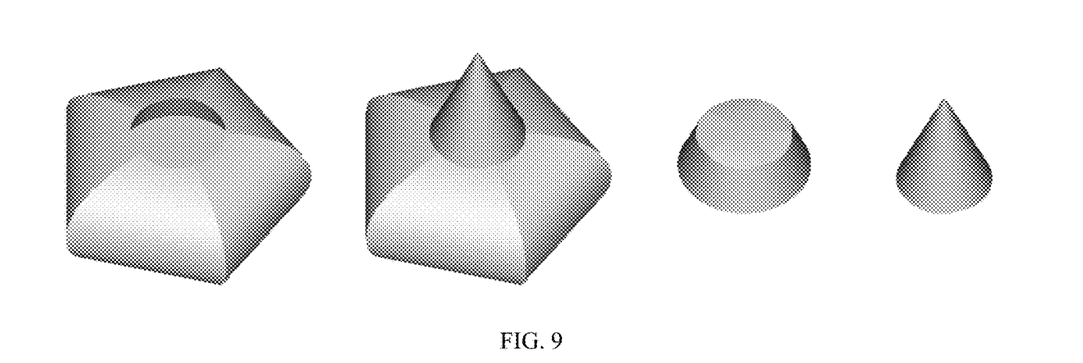
In FIG. 9, a cone and a surface patch participate in a trimming that divides each of the geometries into two sections, and each of the models retains a section of the cone and the patch.

Setting the reservation type attribute allows this system to generate more product models, where the attribute has two or more strings, or integer numbers, chars or other data type values indicate which sections are going to be reserved for creating a model. FIG. 9 shows four examples, in which different sections are reserved.

When defining which sections are to be reserved, the reservation type attribute records a set of values, each of which specifies a geometric property that is the volume a set of facets closed, or the area the facets presented, or the amount of the facets, or a section's identification number, or the visibility of a section.

Visibility can be used as a parameter deciding whether closed sections of a geometry are to be reserved for building a geometric model. In FIG. 5, visible sections are are reserved for modeling the handles.

To check whether a triangle, $T_a$, is spatially visible, that is not obscure from outside, this method has the following procedure.
1. Get an internal point o of $T_a$, whose coordinate value is $a*P_0+b*P_1+(1-a-b)*P_2$. Here a>0, b>0, and a+b<1. Simply, this system sets a=b=⅓ to get the triangle's center.
2. Build a line l: p=o+t*N, which starts from o and passes along the normal of triangle $T_a$, N.
3. Search object B for getting the nearest triangle and the shortest distance, ($D_{min}$, $T_t$). For each triangle $T_b$ of object B, calculate line-plane intersection. If the line and the plane defined by triangle $T_b$ have a valid intersection point ip that falls in triangle $T_b$, then calculate the distance between ip and o. Update ($D_{min}$, $T_b$), set $T_t$ to be $T_b$ if current distance value is less than $D_{min}$.
4. If there is no intersection point or the vector dot product is larger than 0, DOT(N, $N_t$)>0, then $T_a$ is visible. Here $N_t$ is the normal of triangle $T_t$.

Regrouping the Facets

After deciding that a section is to be reserved, each triangle in the section gets a reservation mark. The regrouping step copies all marked triangles of object A into a new geometric object and copies all marked triangles of object B into another new geometric object when the attribute separation is TRUE and this system generates separate geometric objects.

The regrouping step copies all marked triangles of object A and B into a new geometric object if no parameters require this system to generate separate geometric objects.

Figure 10:
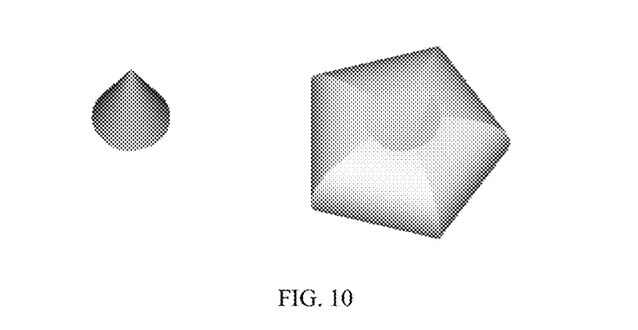
FIG. 10 shows that a model is formed with separated sections, each of which may be treated as a geometric object, for example, being translated to a specific position.

In FIG. 9, each model can be a single object or comprises two trimmed geometric objects. In FIG. 10, a model contains two objects, either of which can be transformed.

Mapping to Rendering Facets

For displaying the new geometric objects generated in the above step, which forms a product model, this system maps operating facets of each new geometric object to a set of rendering facets, it contains two steps: mapping each operating triangle to a rendering triangle, and mapping operating points of each new generated object to a set of three dimensional coordinates.

The new geometric objects can be used by this system to carry out another geometry operation.

Boolean Operation

This system adapted five types of Boolean operations: combination, intersection, exclusion, difference and division. A combination, intersection, exclusion and difference operation usually generates one geometric object, and a division operation creates more objects. In FIG. 5, a division generates two objects: lid and body, which are solid.

A Boolean operation comprises of six steps: mapping rendering facets of geometric object A and B to a set of operating triangles separately, building intersection lines between object A and B, splitting each triangle through which an intersection line passes, deciding whether each triangle is visible, regrouping triangles to form new geometric objects, and mapping operating facets to rendering facets. The first three steps and the last step are the same as that of a geometry trimming.

Differing from geometry trimmings, Boolean operations require no additional parameters for deciding which facets are to be reserved. This system checks whether each triangle is visible through closure detection, one of its procedures is described in section Visible Facets.

Each type of Boolean operations has different regrouping steps for forming new geometric objects, in which visible facets of A or B are reserved or discarded, obscure facets of A or B are reserved or discarded, facets of A and B are merged, and normals of facets of an object are reversed before merging.

Design History

In this system, design history contains a geometric operation sequence and operational results. Recording design history is a function for building complex geometric models that require multi operations and multi geometric objects, enables modifying an operational parameter, replacing an object or an operation without performing undo redo operations many times, thus improves a system's performance.

Constructive Hybrid Geometry

The Constructive Hybrid Geometry class links Boolean operations and geometry trimmings with a linear list, each of the geometry operations comprises either a primary geometric object, an extended geometric object, or a surface patch.

```
class ConstructiveHybridGeometry // CHG, extended CSG
{
    DataList<OperatingGeometry*>  sequence;
    DataList<OperatingGeometry*>  results;
};
```

The Constructive Hybrid Geometry class contains two attributes, sequence and results. The sequence attribute describes an operation list that contains zero, one or more Operating Geometry nodes. The results attribute has zero, one or more Operating Geometry nodes, each of which contains a geometric object that is generated when this system conducts a geometry operation.

A CHG object records all geometry operations that build a geometric model, and this system conducts geometry operations when the operation list has at least two geometric objects and the last Operating Geometry node has a valid Operation Property.

Creating an Operating Geometry

Creating an Operating Geometry object that participates in modeling a geometric product has following procedures:
1. Creating in a memory buffer a geometric object that is a primary geometric object, or an extended geometric object, or a surface patch, specifying size, dimension and position, or control points, knots, orders and weights;
2. Creating an Operating Geometry object that contains the geometric object in the buffer;
3. Setting the Operating Geometry's operation property that contains a geometric operation type and facet property.

The operation type is AND, OR, NOT, EXCLUSION, DIVISION or TRIMMING. The trimming property is detailed with two parameters: reservation type and separation.

Recording an Operating Geometry Node

When the first Operating Geometry is added to a Constructive Hybrid Geometry object, the node's geometry is decomposed into a set of rendering facets according to the facet property defined in the Operating Geometry node, and the set is added to the results list.

When a following Operating Geometry is appended to Constructive Hybrid Geometry object, this system conducts a geometry operation with the steps described in the section GEOMETRY TRIMMING and BOOLEAN OPERATION: mapping rendering facets of the geometry contained in the last Operating Geometry node to a set of operating triangles, noted as geometry B, in which each triangle has neighbors; creating intersection lines with geometry B and each set of facets stored in the results list, noted as geometry A; splitting each triangle through which an intersection line passes; deciding whether a facet is visible for a Boolean operation, or deciding whether a facet is to be reserved for a geometry trimming; regrouping facets to form new geometric objects; and mapping to rendering facets that form new geometries and updating the geometries in the results list.

Figure 11:
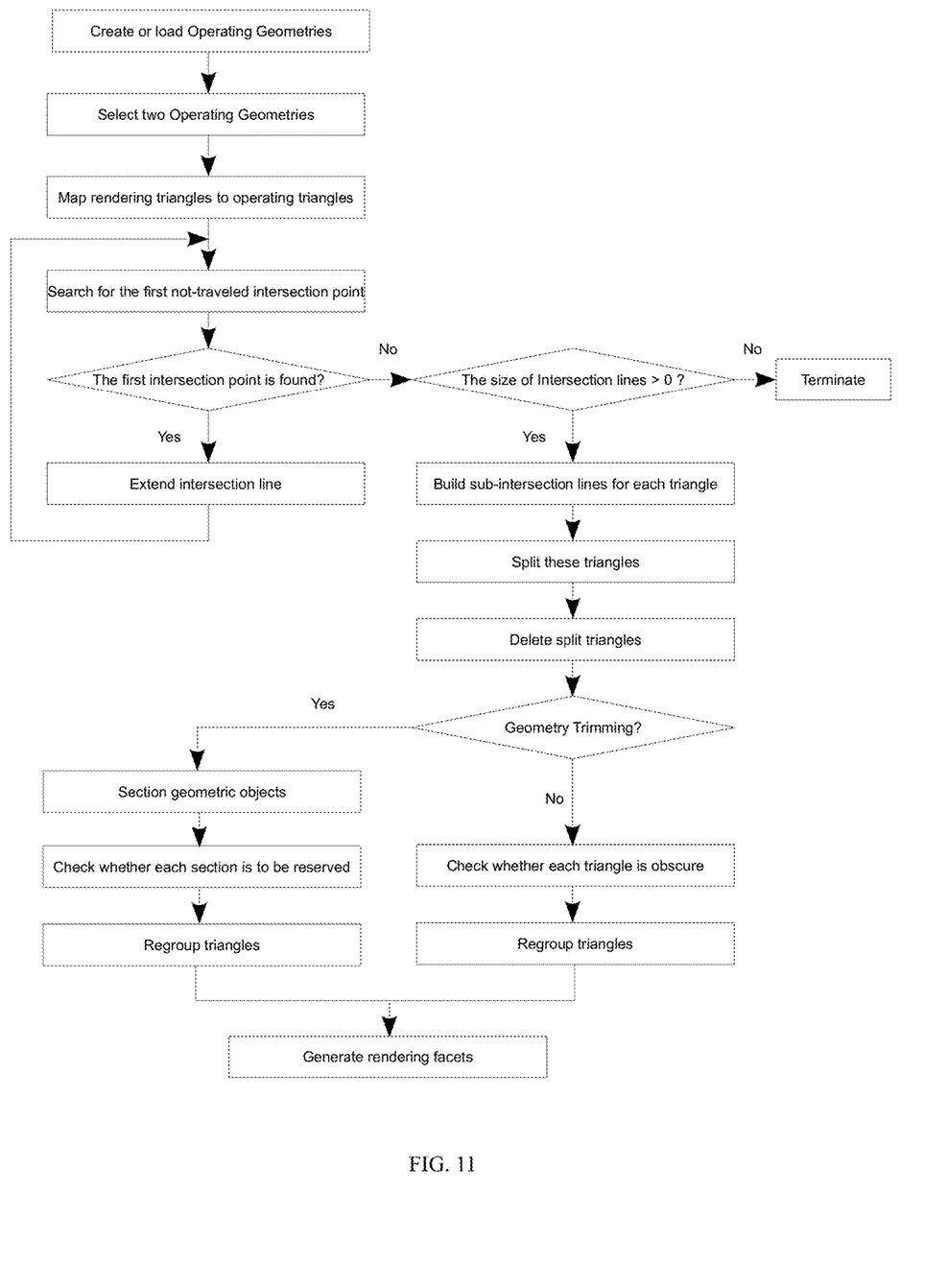
FIG. 11 is a main flowchart of this system for conducting a geometry operation.
Figure 12:
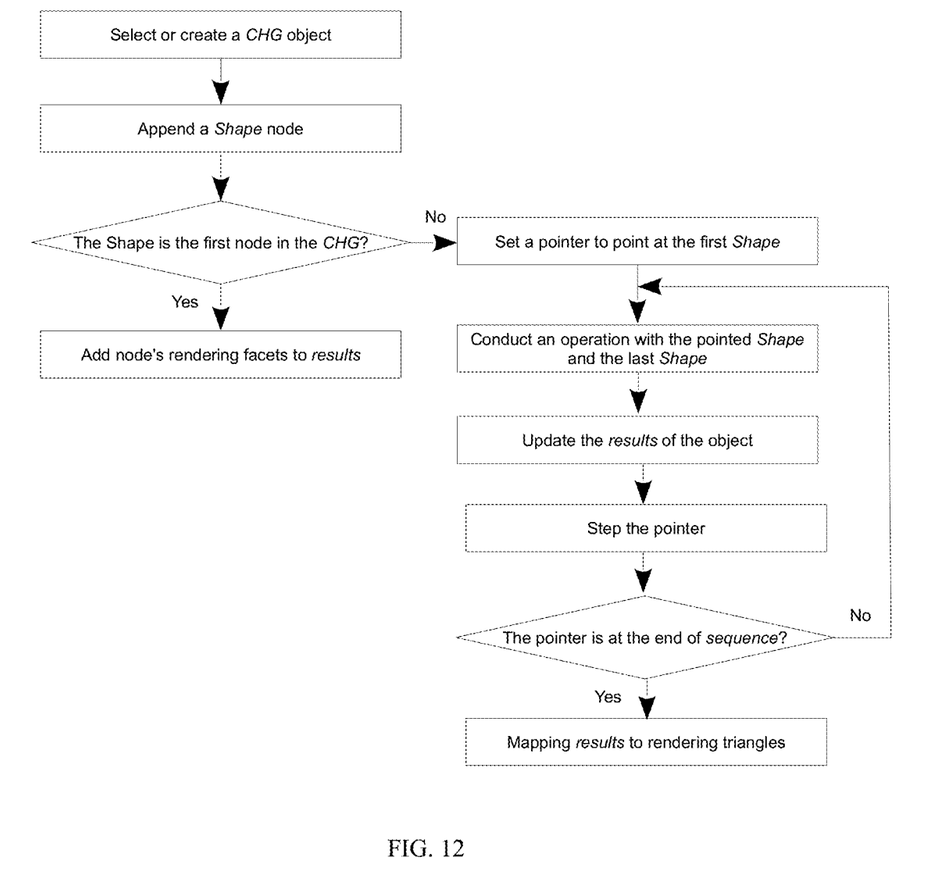
FIG. 12 is a main flowchart of this system for conducting geometry operations when an Operating Geometry is appended to the end of operation sequence.

When the results list has more geometries, steps two to the last one in above paragraph repeat more times, each geometry is operated with the following Operating Geometry node. FIG. 11 is a main flowchart of this system for conducting a geometry operation. FIG. 12 is a main flowchart of this system for conducting geometry operations when an Operating Geometry is appended to the end of operation sequence.

Modifying an Operation Sequence

This method provides these commands that modify an operation sequence list: insert an Operating Geometry into the list, append an Operating Geometry to the list, delete an Operating Geometry from the list, modify an Operating Geometry's property that includes geometric property and operational property.

After the sequence list is modified, this system update operational results. In some cases, renewing the results is required.

Updating Operational Results

This method provides these steps updating operational results when an Operating Geometry node is added to a CHG object and this system conducts a geometry operation, this system executes one or more of these steps separately:
1. Adding an Operating Geometry to the results list, wherein the Operating Geometry contains a geometry and its Operation Property is null or is ignored;
2. Deleting facets from a geometry contained in an Operating Geometry node in the results list;
3. Adding facets to a geometric object contained in an Operating Geometry node in the results list;
4. Deleting an Operating Geometry node from the results list.

What is claimed:

1. A method performing geometry trimmings that build three dimensional geometric models for a computer aided design system, using rendering facets that are geometric facets being rendered to represent geometric objects A and B that participate in a geometry trimming, implemented in a computer system and operated with a computer, the method comprising:

mapping respectively rendering facets of A and B to a set of operating triangles that contain neighboring triangles;

building an intersection line that repeats more times and forms intersection lines starts with searching for an intersection point where a pair of triangles ($T_a$, $T_b$) intersect, then catching neighboring triangles of the pair and conducting edge-triangle intersection to extend a line until all triangles are traveled or the line gets closed, wherein $T_a$ belongs to A and $T_b$ belongs to B;

splitting each triangle through which an intersection line passes with intersection line segments that form one or more sub-intersection lines using modified Watson method, wherein each triangle is divided into more smaller triangles;

sectioning respectively A and B with intersection lines, wherein an intersection line sections a geometric object into two sections, left side and right side;

setting each geometric object's reservation type attribute that indicates one or more sections of the geometric object, wherein the reservation type attribute is volume, or area, or amount of facets, or visibility of a section;

calculating each section's geometric property that matches with the reservation type attribute and deciding which sections of the geometric objects are to be reserved, wherein the method calculates volume of a section, or calculates area of a section, or calculates amount of facets of a section, or calculates visibility of a section;

regrouping triangles building one or more new geometric objects in accordance with an attribute, separation, by copying reserved triangles; and mapping each new geometric object to rendering facets forming a three dimensional geometric model.

2. The method of claim 1 wherein mapping rendering facets of geometric object A or B to a set of operating triangles comprises: copying points from rendering facets to the set of operating triangles, copying rendering facets to the set of operating triangles, setting up neighboring triangles for each operating triangle.

3. The method of claim 1 wherein searching for an intersection point and extending the line comprise edge-triangle intersection calculation: checking if an edge of triangle $T_a$ intersects with the plane defined by triangle $T_b$ at a point, then further checking whether the point is in $T_b$.

4. The method of claim 1 wherein generating a sub-intersection line from an intersection line comprises: checking each intersection point of the line if it is in the triangle, then adding the point to the sub-intersection line, checking its following intersection points of the line until the line end or until a point that is out of the triangle.

5. The method of claim 1 wherein modified Watson method comprises: building an outline point sequence linking all the sub-intersection lines and vertices of the triangle where applicable, adding four points forming a bigger box that encloses the point sequence; splitting the box into two triangles with one of diagonal lines and adding the triangles to a triangle set; inserting every point of the sub-intersection lines into the triangle set, including the steps: splitting each triangle whose circumcircle contains the point or through which the last two points formed segment passes, erasing it from the triangle set and adding it to a deletion triangle set, forming a polygon with the deletion triangle set and clearing the deletion triangle set, using the polygon to generate triangles and adding the triangles to the triangle set.

6. The method of claim 1 wherein sectioning a geometric object with an intersection line comprises: setting an identification number of each point of the geometric object to be zero, setting identification numbers of the points of an intersection line in ascending order, identifying boundary triangles, determining whether each triangle is to the left side or right side of the intersection line and assigning the triangle an ID for marking a section.

7. The method of claim 1 wherein reservation type indicates a geometric property and calculating each section's geometric property is calculating volume, or calculating area, or calculating amount of facets, or calculating visibility of a triangle, $T_a$, in the section that further comprises: building a line starting from the triangle's center and passing along the triangle's normal, N; searching object B for a nearest triangle $T_t$, whose normal is noted as $N_t$, by calculating line-plane intersection; setting $T_a$ to be visible if there is no intersection point or the vector dot product is larger than 0, DOT(N, $N_t$)>0.

8. The method of claim 1 wherein regrouping triangles copies all marked triangles of object A and B into more new geometric objects when the separation attribute is TRUE.

9. The method of claim 1 wherein mapping new geometric object to rendering facets comprises: mapping each operating triangle to a rendering triangle, and mapping points of each new generated object to a set of three dimensional coordinates.

10. A computer system performing geometry trimmings that build three dimensional geometric models for product design, using rendering facets that are geometric facets being rendered to represent geometric objects A and B, the system comprising: a computer with input devices for entering data and commands, a display device showing user interface and geometric objects, a medium storing geometric data and instructions, and a processor that executes these steps:
mapping respectively rendering facets of A and B to a set of operating triangles that contain neighboring triangles;
building an intersection line that repeats more times and forms intersection lines starts with searching for an intersection point where a pair of triangles ($T_a$, $T_b$) intersect, then catching neighboring triangles of the pair and conducting edge-triangle intersection to extend a line until all triangles are traveled or the line gets closed, wherein $T_a$ belongs to A and $T_b$ belongs to B;
splitting each triangle through which an intersection line passes with intersection line segments that form one or more sub-intersection lines using modified Watson method, wherein each triangle is divided into more smaller triangles;
sectioning respectively A and B with intersection lines, wherein an intersection line sections a geometric object into two sections, left side and right side;
setting each geometric object's reservation type attribute that indicates one or more sections of the geometric object, wherein the reservation type attribute is volume, or area, or amount of facets, or visibility of a section;
calculating each section's geometric property and deciding which sections of the geometric objects are to be reserved, wherein the system calculates volume of a section, or calculates area of a section, or calculates amount of facets of a section, or calculates visibility of a section;
regrouping triangles building one or more new geometric objects in accordance with an attribute, separation, by copying reserved triangles; and
mapping each new geometric object to rendering facets forming a three dimensional geometric model.

11. The system of claim 10 wherein mapping rendering facets of geometric object A or B to a set of operating triangles comprises: copying points from rendering facets to the set of operating triangles, copying rendering facets to the set of operating triangles, setting up neighboring triangles for each operating triangle.

12. The system of claim 10 wherein searching for an intersection point and extending the line comprise edge-triangle intersection calculation: checking if an edge of triangle $T_a$ intersects with the plane defined by triangle $T_b$ at a point, then further checking whether the point is in $T_b$.

13. The system of claim 10 wherein generating a sub-intersection line from an intersection line comprises: checking each intersection point of the line if it is in the triangle, then adding the point to the sub-intersection line, checking its following intersection points of the line until the line end or until a point that is out of the triangle.

14. The system of claim 10 wherein modified Watson method comprises: building an outline point sequence linking all the sub-intersection lines and vertices of the triangle where applicable, adding four points forming a bigger box that encloses the point sequence; splitting the box into two triangles with one of diagonal lines and adding the triangles to a triangle set; inserting every point of the sub-intersection lines into the triangle set, including the steps: splitting each triangle whose circumcircle contains the point or through which the last two points formed segment passes, erasing it from the triangle set and adding it to a deletion triangle set, forming a polygon with the deletion triangle set and clearing the deletion triangle set, using the polygon to generate triangles and adding the triangles to the triangle set.

15. The system of claim 10 wherein sectioning a geometric object with an intersection line comprises: setting the identification number of each point of the geometric object to be zero, setting identification numbers of the points of an intersection line in ascending order, identifying boundary triangles, determining whether each triangle is to the left side or right side of the intersection line and assign the triangle an ID for marking a section.

16. The system of claim 10 wherein reservation type indicates a geometric property and calculating each section's geometric property is calculating volume, or calculating area, or calculating amount of facets, or calculating visibility of a triangle, $T_a$, in the section that further comprises: building a line starting from the triangle's center and passing along the triangle's normal, N; searching object B for a nearest triangle $T_t$, whose normal is noted as $N_t$, by calculating line-plane intersection; setting $T_a$ to be visible if there is no intersection point or the vector dot product is larger than 0, DOT(N, $N_t$)>0.

17. The system of claim 10 wherein regrouping triangles copies all marked triangles of object A and B into more new geometric objects when the separation attribute is TRUE.

18. The system of claim 10 wherein mapping new geometric object to rendering facets comprises: mapping each operating triangle to a rendering triangle, and mapping points of each new generated object to a set of three dimensional coordinates.

* * * * *